(12) United States Patent
Höfinger

(10) Patent No.: US 9,193,456 B2
(45) Date of Patent: Nov. 24, 2015

(54) ROTOR BLADE WITH INTEGRATED PASSIVE SURFACE FLAP

(75) Inventor: Marc Höfinger, Braunschweig (DE)

(73) Assignee: Deutsches Zentrum fuer Luft-und Raumfahrt e.V., Cologne (DE)

( * ) Notice: Subject to any disclaimer, the term of this patent is extended or adjusted under 35 U.S.C. 154(b) by 842 days.

(21) Appl. No.: 13/237,075

(22) Filed: Sep. 20, 2011

(65) Prior Publication Data

US 2012/0070288 A1 Mar. 22, 2012

(30) Foreign Application Priority Data

Sep. 21, 2010 (DE) .......................... 10 2010 041 111

(51) Int. Cl.
*B64C 27/72* (2006.01)
*B64C 23/00* (2006.01)

(52) U.S. Cl.
CPC ............... *B64C 27/72* (2013.01); *B64C 23/005* (2013.01); *B64C 2027/7261* (2013.01); *B64C 2230/28* (2013.01); *Y02T 50/166* (2013.01); *Y02T 50/34* (2013.01)

(58) Field of Classification Search
CPC .... B64C 23/005; B64C 27/46; B64C 27/467; B64C 27/51; B64C 27/72; B64C 2003/148; B64C 2230/28; B64C 2027/721; Y02T 50/166; Y02T 50/34
USPC .............. 416/41, 42, 44, 23, 146 R; 244/211, 244/214, 215, 212
See application file for complete search history.

(56) References Cited

U.S. PATENT DOCUMENTS 1,879,618 A * 9/1932 Icre ................................ 244/203
2,034,218 A * 3/1936 Weick et al. ................... 244/212
(Continued)

FOREIGN PATENT DOCUMENTS

DE 198 59 041 C1 3/2000
DE 198 08 196 C2 6/2003
(Continued)

OTHER PUBLICATIONS

Meyer, Robert K. J. "Experimentelle Untersuchungen von Rückstrombremsen auf Tragflügeln zur Beeinflussung von Strömungsablösungen", Dissertation TU Berlin Hermann-Föttinger-Institut für Strömungsmechanik, Mensch & Buch Verlag, ISBN 3-89820-205-4, Jan. 20, 1968.
(Continued)

*Primary Examiner* — Craig Kim
*Assistant Examiner* — Adam W Brown
(74) *Attorney, Agent, or Firm* — Thomas | Horstemeyer, LLP

(57) ABSTRACT

A rotor blade for a driven horizontal rotor of a rotary-wing aircraft comprises an elongated main body which includes a leading edge, a trailing edge, and an upper surface extending between the leading edge and the trailing edge. The rotor blade further comprises at least one flap having a front end and a rear end and mounted to the main body at its front end swiveling about a swiveling axis running in parallel to the radial or spanwise axis of the rotor blade. The flap has a basic position in which it lies flat against the upper surface of the main body. Further, the flap is passively swiveled by aerodynamic forces and inertial forces about its swivel axis to raise above the upper surface of the main body, and a reset force acts upon the flap to reset it into its basic position on the surface of the main body.

11 Claims, 2 Drawing Sheets

(56) References Cited

U.S. PATENT DOCUMENTS

| | | | |
|---|---|---|---|
| 2,373,088 A * | 4/1945 | Florence et al. | 340/966 |
| 2,625,997 A | 1/1953 | Doak | |
| 3,215,370 A | 11/1965 | Strydom | |
| 4,514,143 A | 4/1985 | Campbell | |
| 6,168,379 B1 | 1/2001 | Bauer | |
| 6,203,269 B1 * | 3/2001 | Lorber et al. | 415/115 |
| 7,748,958 B2 * | 7/2010 | McVeigh et al. | 416/1 |
| 2002/0079405 A1 * | 6/2002 | Layukallo | 244/130 |
| 2009/0308971 A1 * | 12/2009 | Shams et al. | 244/46 |

FOREIGN PATENT DOCUMENTS

| | | |
|---|---|---|
| DE | 10 2005 018 427 A1 | 11/2006 |
| EP | 1 144 248 B1 | 12/1999 |
| EP | 1 714 869 B1 | 3/2006 |

OTHER PUBLICATIONS

European Search Report in co-pending, related EP Application No. 11 18 2069, mailed Oct. 23, 2013.

* cited by examiner

ROTOR BLADE WITH INTEGRATED PASSIVE SURFACE FLAP

CROSS REFERENCE TO RELATED APPLICATIONS

This application claims priority to co-pending German Patent Application No. DE 10 2010 041 111.6 entitled "Rotorblatt mit integrierter passiver Oberflächenklappe" filed Sep. 21, 2010.

FIELD OF THE INVENTION

The invention relates to a rotor blade for a driven horizontal rotor of a helicopter or rotary wing airplane.

A horizontal rotor is a rotor rotating in an essentially horizontal plane about an essentially vertical rotation axis.

When, in the following, a horizontal rotor of a helicopter is mentioned only, the respective statement also applies to any other rotary wing airplane having a driven rotor, as the problem solved by the present invention is the same with all rotary wing airplanes having a driven horizontal rotor.

BACKGROUND OF THE INVENTION

The airspeed of helicopters is inter alia limited by aerodynamic effects at the rotor blades. Due to the superposition of rotational speed and air speed, high flow velocities are present on the advancing side of the horizontal rotor which if too high can result in local shock waves at the advancing rotor blades. On the retreating side of the horizontal rotor, the flow velocity at the rotor blades with regard to the surrounding air is reduced. In an inner area close to the rotor axis, the flow velocity may even be reversed, resulting in a flow from the trailing edge to the leading edge of the rotor blade. For the purpose of providing equal lift distribution or ascending forces on both sides of the horizontal rotor, despite the strongly differing rotor blades speeds with regard to the surrounding air, the incidence or angle of attack of the rotor blades has to be increased on the retreating side and decreased on the advancing side of the horizontal rotor. Thus, the incidence of the rotor blades has to be periodically varied over each rotation of the horizontal rotor of a helicopter flying forward. These variations result in varying angle of attack and may locally cause a dynamic stall. The dynamic stall causes a short increase in lift followed by a sharp reduction or loss of the lift. As a result, there are strong variations in the drag and in the pitch moment of the rotor blade. This high frequency transient aerodynamic effect results in high structural loads on the rotor blades and the entire drive and control system of a helicopter, which is accompanied by a strong excitation of vibrations. A further increase of the air speed of a helicopter is not possible without taking measures to unload its horizontal rotor.

In a rotor blade for a helicopter known from DE 198 08 196 C2, a movable flap is provided at the trailing edge of the rotor blade. The angle of the flap is actively adjustable with regard to the remainder of the rotor blade. The flap is connected to the main body of the rotor blade via a flexible fiber joint. By means of the flap of this known rotor blade, it is intended to increase the rotor performance and to simultaneously reduce the vibration level. The connection of the flap to the main body via the flexible fiber joint is intended to reduce the wear in the area of the flap as compared to flaps which are connected via common two-part pivot joints. The known rotor blade having an actively operated flap is very complex as compared to a rotor blade without flap.

A rotor blade with advanced behavior with regard to stall occurring at strongly varying angles of attack is known from DE 10 2005 018 427 A1. Here, devices are arranged in the area of the profile front edge (leading edge) to enhance the behavior at increased angle of attack. These devices include at least one passive vortex generator which is at or close to the stagnation point of the rotor blade with low angles of attack so that it is out of function, and which emerges out of the boundary layer of an accelerated flow on the underpressure side of the rotor blade with increased stall angles so that it starts to operate at higher angles of attack.

Up to now, there is no system ready for serial production for controlling the dynamic stall at rotor blades of helicopters. The selection of the blade profile and the profile distribution in radial direction have an influence. In this selection, however, other boundary conditions are to be met. For example, a wide area of Mach and Reynolds numbers and of angle of attack have to be covered. In practice, the area in which dynamic stall occurs is up to now avoided by limiting the overall air speed.

Experimental research in a wind tunnel has been carried out with regard to surface flaps on airfoils of fixed wing airplanes to evaluate the potential of these devices to suppress the reversed flow that can occur locally on the airfoils when the flow separates at high angles of attack (see Meyer, Robert K. J., "Experimentelle Untersuchungen von Rückstrombremsen auf Tragflügeln zur Beeinflussung von Strömungsablösungen", Dissertation TU Berlin Hermann-Föttinger-Institut für Strömungsmechanik, Mensch & Buch Verlag, ISBN 3-89820-205-4).

DE 198 59 041 C1 discloses an adjustable blade profile for a rotor blade of a rotary wing airplane. The blade profile is adjustable about an axis running in parallel to the radial axis of the rotor blade. This adjustment of the entire blade profile shall take place automatically due to variations of the lift operating against an elastic means under the influence of the centrifugal force on the rotor blade. This concept, however, has not been applied in practice.

The conditions at a rotor blade of a helicopter basically differ from the conditions at an air foil of a fixed wing airplane. The particularity of a helicopter is the blade velocity with regard to the surrounding air, which strongly varies periodically during one rotor revolution. The stall at a rotor blade of a helicopter thus takes place within much shorter time, and generally the stall emerges from the leading edge of the blade profile. At fixed-wing airfoils, the stall mostly begins at the trailing edge.

A four-bladed rotor of a helicopter of the 2,000 kg-class (such as the helicopter EC 135), for example, rotates at a frequency of 6.5 Hz corresponding to an angular speed of 41 rad/sec. The dynamic stall due to the variation of the angle of attack of the rotor blade over each rotation takes place in an azimuthal area of about 60°, which equals approximately 1 rad. This area is passed by the rotor blade within approximately 0.02 sec.

Considering a helicopter, the dynamic stall occurs at high forward flight speeds and limits the maximum flight speed of the helicopter. For a fixed wing airplane, stall occurs at too low air speeds and limits the minimum air speed.

There still is a need for a rotor blade in which the negative effects associated with dynamic stall, such as loss of lift, increase of drag and pitching moment and thus increased vibrations and loads and component stress, is shifted towards higher angles of attack and thus to higher forward flight velocities by means of simple devices not affecting the integrity of the main body of the rotor blade.

SUMMARY OF THE INVENTION

The following presents a simplified summary in order to provide a basic understanding of one of more aspects of the invention. This summary is not an extensive overview of the invention, and is neither intended to identify key or critical elements of the invention, nor to delineate the scope thereof. Rather, the primary purpose of this summary is to present some concepts of the invention in simplified form as a prelude to the more detailed description that is presented later.

The present invention relates to a rotor blade for a driven horizontal rotor of a rotary-wing airplane, which comprises an elongated main body and at least one flap. The main body of the rotor blade according to the invention includes a leading edge, a trailing edge, and an upper surface extending between the leading edge and the trailing edge. The flap of the rotor blade according to the invention has a front end and a rear end and is mounted to the main body at its front end swiveling about a swiveling axis running in parallel to the radial or spanwise axis of the rotor blade. The flap has a basic position in which it lies flat against the upper surface of the main body. Further, the flap is designed to be passively swiveled by aerodynamic forces and inertial forces about its swivel axis to raise above the upper surface of the main body, and the flap is swivel-mounted to the main body in such a way that a reset force acts upon the flap to reset it into its basic position.

Further, the present invention relates to a driven horizontal rotor of a rotary-wing airplane comprising a plurality of rotor blades according to the present invention as defined above.

Other features and advantages of the present invention will become apparent to one skilled in the art upon examination of the following drawings and the detailed description. It is intended that all such additional features and advantages be included herein within the scope of the present invention, is defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

Figure 1:
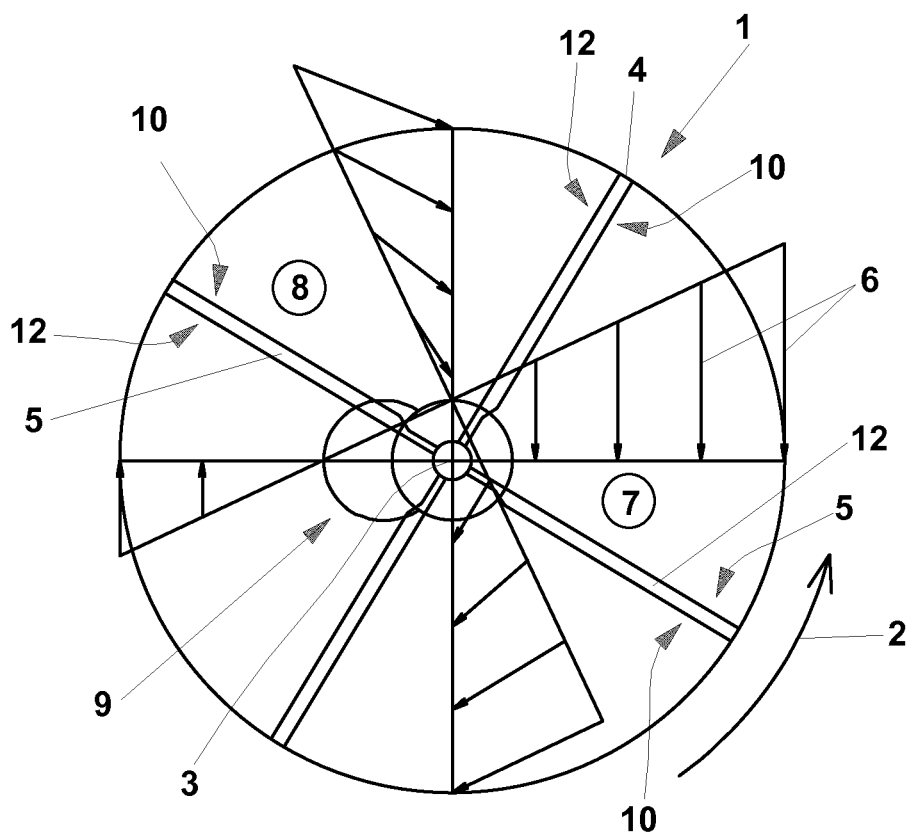
FIG. 1 illustrates a horizontal rotor of a helicopter flying forward and the resulting blade velocities of rotor blades of the horizontal rotor with regard to the surrounding air.

In the new rotor blade, at least one flap has a basic position in which it lies flat against the upper surface of the main body, i.e. it is a so called surface flap. This flap may be swiveled out of its basic position away from the surface of the main body against an elastic reset force. However, the flap is not actively swiveled away from the surface of the main body by means of any actuator but only by forces which result from the operation of the rotor blade, i.e. by aerodynamic forces and inertial forces. Correspondingly, it is sufficient to adjust the elastic reset force on the flap of the new rotor blade depending on the position, shape and dimensions of the flap. Neither any actuating element for the flap nor a controller for such elements has to be provided.

As the aerodynamic conditions at the rotor blade vary quickly due to the rotation of the horizontal rotor, a condition in which stall occurs is only existing for a very short time. During this short time the physical effect of the passive surface flap of the new rotor blade is to avoid an upstream propagation of a separated flow in the rotational direction of the horizontal rotor up to the leading edge of the rotor blade. If the flow separates from the rotor blade in the area of the flap, the flap raises due to the resulting pressure difference. The flow then still adheres to the surface upstream of the flap. Downstream of the flap, the flow will remain separated. The separation area, however, does not further expand in upstream direction. Thus, it is possible to interrupt the propagation of the separation of the flow up to the leading edge of the rotor blade. This effect is able to shift the occurrence of dynamic stall towards higher angles of attack. Further, the raised flap of the rotor blade according to the present invention provides for a flow resistance in case of a reversed flow on the rotor blade on the retreating side of the horizontal rotor close to the rotor axis. As the elastic reset force acts upon the flap, the flow beneath the flap from behind produces a force vector which both has a horizontal component driving the blade and a vertical component in lift direction. Inertial forces which act upon the flap with regard to the main body of the rotor blade only raise the flap with respect to the main body of the rotor blade when its incidence angle is increased, this equals a rotation of the blade in clockwise direction. With a decreasing incidence, the blade now rotating anti-clockwise, the inertial forces on the flap lower the flap towards the surface of the main body of the rotor blade. Thus, the inertial forces both support raising the flap with increasing incidence of the rotor blade and setting back the flap to the surface of the main body of the rotor blade with decreasing incidence.

The flap of the new rotor blade may itself be made of an elastic material which provides for the reset force against which the flap may be raised or swiveled upwards away from the upper surface of the main body of the rotor blade. Alternatively, the flap may be mounted to the main body via a pivot joint. The elastic reset force may then be applied to the flap by an additional elastic element. Preferable, however, the joint is a solid body joint which also provides for the elastic reset force.

In the direction of the profile chord of the rotor blade, the flap may have a typical length of 10 to 30% of the profile chord. It is essential that the flap has a certain length in this direction so that it raises sufficiently high above the surface of the rotor blade upon swiveling upward by a limited angle. On the other hand, the stability of the arrangement decreases with increasing length of the flap in the direction of the profile chord of the rotor blade.

Several flaps may be provided one behind the other in the direction of the profile chord of the rotor blade at the upper surface of the rotor blade. This is of particular advantage, if the area in which the separation of the flow from the upper surface of the rotor blade will start and should thus be stopped by raising a flap shifts with changing operation conditions, or if repeated trials of stopping a propagation of this separation in total provide for an increased success rate.

In the direction of the radial or spanwise axis of the rotor blade, the flaps may have a width of 15 to 30% of the length, i.e. of the span of the rotor blade. The flaps may thus only span over a very small area in the direction of the longitudinal axis of the rotor blade or over an extended area in this direction.

Depending on which of the mentioned effects of the passively raising flap is of primary interest, the flap may be arranged close to the blade tip or close to the rotor axis of the horizontal rotor. It is also possible to provide several flaps at the upper surface of the main body of the rotor blade which are distributed in the longitudinal direction of the rotor blade. As there may also be several flaps distributed in the direction of the profile chord of the rotor blade at the upper surface of the main body of the rotor blade, there may actually be an array of flaps. These flaps may have different sizes and stiffness depending on their actual location on the rotor blade.

Now referring in greater detail to the drawings, FIG. 1 illustrates a horizontal rotor 1 of a helicopter or rotary wing airplane which as such is not further depicted here. The horizontal rotor 1 rotates in an approximately horizontal plane about an approximately vertical rotor axis 3 and at the same time moves horizontally forward at a velocity of 0.4 times the velocity of the blade tips 4 of the rotor blades 5 of the horizontal rotor 1 around the rotor axis 3. This results in different blade velocities of the rotor blades 5 with respect to the surrounding air which are indicated by vectors 6. The blade velocity of the rotor blades 5 is particularly high on the advancing side 7 on which the rotor blades 5 run forward in the same direction as the entire helicopter moves forward. To the contrary, the blade velocity of the rotor blades 5 is strongly reduced on the retreating side 8 where the rotor blades run backward with regard to the moving direction of the entire helicopter. On this retreating side 8, there is even an area 9 close to the rotor axis 3 in which the blade velocity of the rotor blades 5 is negative, i.e. in which the flow of the surrounding air approaches the rotor blades 5 from their trailing edge 10 instead of their leading edge 12. To nevertheless achieve a same lift distribution on the advancing side 7 and on the retreating side 8 of the horizontal rotor 1, the angle of attack of the rotor blades 5 has to be strongly varied over each rotation about the rotor axis 3. This variation may cause dynamic stall which is accompanied by an undesired creation of noise and excitation of vibrations due to the strongly varying lift of the rotor blades.

Figure 2:
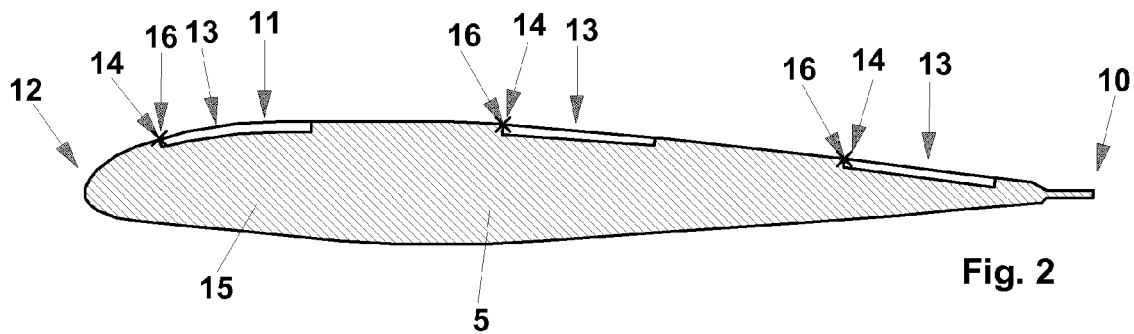
FIG. 2 illustrates a cut through a rotor blade having three flaps mounted to an upper surface of the main body of the rotor blade.

FIG. 2 illustrates a section through a rotor blade 5. Flaps 13 by which inter alia the dynamic stall can be shifted towards higher angles of attack and thus higher forward flight velocities are provided at an upper surface 11 of a main body 15 of the rotor blade 5. These flaps 13 are each mounted to the main body 15 at their front end, i.e. at their end pointing towards the leading edge 12, in such a way that they are swiveling about a swivel axis 14. An elastic reset force acts against swiveling the flaps 13 away from the main body 15 of the rotor blade, which increases with increasing swivel angle and which resets the flaps 13 into their positions at the surface of the main body 15 when no other forces are present. This reset force may, for example, be provided by mounting the flaps 13 to the main body 15 via solid body joints 16.

Figure 3:
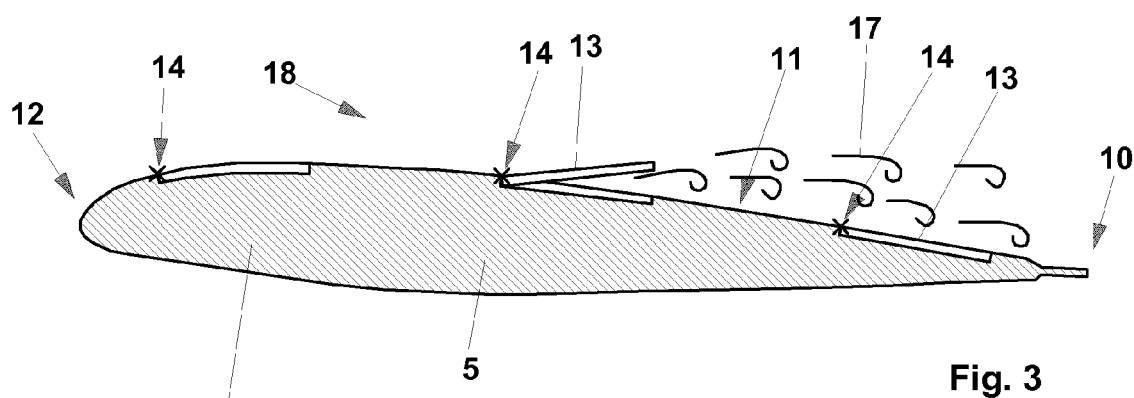
FIG. 3 illustrates a cut trough the rotor blade according to FIG. 2 with a flow which starts to separate from the rotor blade in a downstream area of the profile of the rotor blade and with a middle flap being raised as a result.

FIG. 3 illustrates a separation of a flow from the upper surface 11 of the rotor blade 5 beginning in an area of the trailing edge 10 of the rotor blade 5. A pressure difference is created between the area of the separated flow 17 and the upstream area of a still attached flow. This pressure difference acts upon the middle flap 13 and raises it. The raised flap 13 delimits the area of the separated flow 17 in upstream direction. At the upper surface of the flap 13, the flow 18 is still attached. A quick propagation of the area of the separated flow 17 in upstream direction is thus inhibited.

Figure 4:
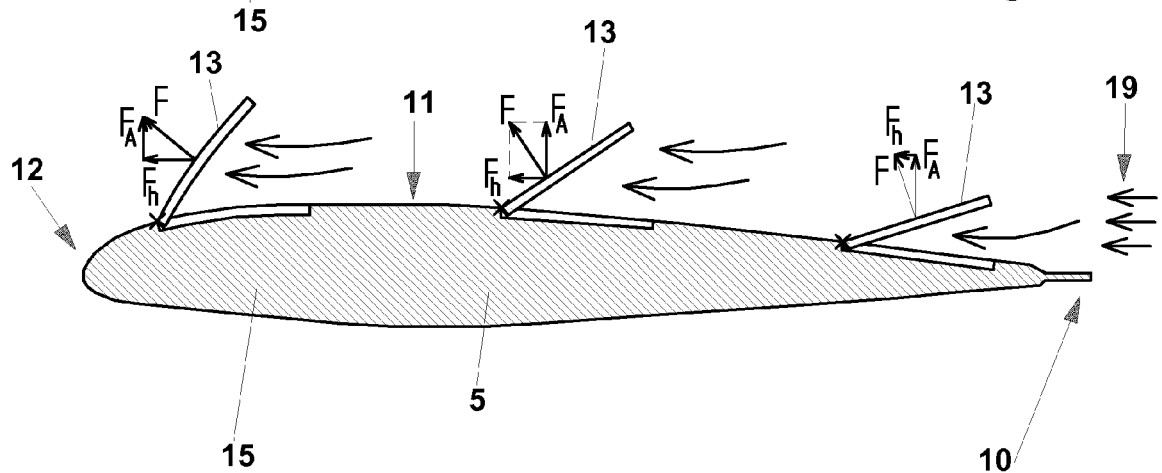
FIG. 4 illustrates the rotor blade according to FIGS. 2 and 3 in case of a reversed flow.

FIG. 4 illustrates a backflow 19 on the rotor blade 5 from its trailing edge 10 as it occurs in the area 9 with backflow according to FIG. 1. The backflow 19 raises the flaps 13 at the upper surface 11 of the rotor blade 5. The forces F now acting upon the flaps 13 and thus on the rotor blade 5 comprise both a horizontal component Fh and a vertical component FA. The horizontal component Fh equals a force component driving the horizontal rotor 1 according to FIG. 1, while as the vertical component FA represents an additional force component acting in lift or ascending force direction particularly in that area 9 in which there is basically a lack of lift.

Figure 5:
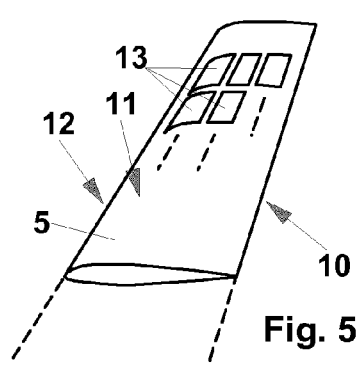
FIG. 5 illustrates a first distribution of several flaps over the upper surface of the main body of a rotor blade.

FIG. 5 illustrates a two dimensional distribution of several flaps 13 over the upper surface 11 of the rotor blade 5. Several flaps 13 are both provided in the direction of the profile chord between the leading edge 12 and the trailing edge 10 and in a radial or spanwise direction of the rotor blade 5.

Figure 6:
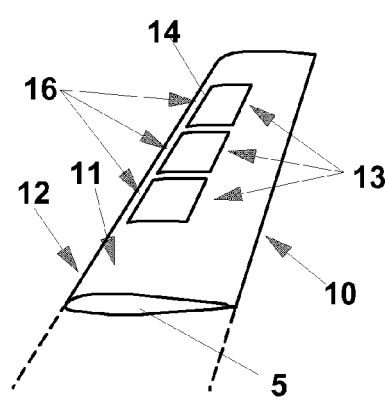
FIG. 6 illustrates a second distribution of several flaps over the upper surface of the main body of a rotor blade.

According to FIG. 6 several flaps 13 are only provided in the radial or spanwise direction of the rotor blade 5. Whereas all flaps 13 depicted in FIG. 5 or FIG. 6 are equal, they may be designed differently depending on their position on the upper surface 11, i.e. particularly depending on their distance to the vertical rotor axis of the horizontal rotor, and depending on their distance to the leading edge 12 of the rotor blade 5 in very different ways. Particularly they may be subject to very different elastic reset forces resetting them into their basic position at the upper surface 11.

Many variations and modifications may be made to the preferred embodiments of the invention without departing substantially from the spirit and principles of the invention. All such modifications and variations are intended to be included herein within the scope of the present invention, as defined by the following claims.

I claim:

1. A driven horizontal rotor of a rotary-wing airplane comprising a rotor axis and a plurality of rotor blades rotating about the rotor axis, the incidence angle of each of the rotor blades increasing and decreasing over each rotation of the respective rotor blade about the rotor axis, each of the rotor blades comprising:
   an elongated main body, the main body including:
      a leading edge,
      a trailing edge, and
      an upper surface extending between the leading edge and the trailing edge, and having a profile comprising a curvature,
   at least one flap,
      having a front end and a rear end, and
      mounted to the main body at its front end swiveling about a swiveling axis running in parallel to the radial axis of the rotor blade,
   wherein the flap has a basic position in which it lies flat against the upper surface of the main body such that the flap follows the curvature of the profile of the upper surface, wherein the flap is swivel mounted to the main body in such a way that a reset force acts upon the flap, wherein the flap is designed to be passively swiveled by aerodynamic forces and inertial forces acting against the reset force about its swivel axis to raise the upper surface of the main body with increasing incidence angle of the rotor blade, and wherein the reset force acts upon the flap to reset it into its basic position.

2. The rotor blade of claim 1, wherein the flap is made of an elastic material.

3. The rotor blade of any of claim 1, wherein the flap is mounted to the main body via a pivot joint.

4. The rotor blade of claim 3, wherein the joint is a solid body joint.

5. The rotor blade of claim 1, wherein the flap, in a direction of a profile chord of the rotor blade, has a length of 10 to 30% of the profile chord of the rotor blade.

6. The rotor blade of claim 5, wherein several flaps are provided one behind the other in the direction of a profile chord of the rotor blade at the upper surface of the main body.

7. The rotor blade of claim 1, wherein the flap, in a direction of a longitudinal axis of the rotor blade, has a width of 5 to 30% of the length of the rotor blade.

8. The rotor blade of claim 7, wherein the flap is arranged adjacent to the rotor axis of the horizontal rotor.

9. The rotor blade of claim 7, wherein the flap is arranged adjacent to a blade tip of the rotor blade.

10. The rotor blade of claim 7, wherein several flaps are provided at the upper surface of the main body, the flaps being distributed in the radial direction of the rotor blade.

11. The rotor blade of claim 1, wherein several flaps are provided at the upper surface of the main body in a two-dimensional array both extending in a direction of a profile chord of the rotor blade and in a direction of a longitudinal axis of the rotor blade.

* * * * *